US012014862B2

(12) United States Patent
Cedell

(10) Patent No.: US 12,014,862 B2
(45) Date of Patent: Jun. 18, 2024

(54) COIL

(71) Applicant: MAGCOMP AB, Eslöv (SE)

(72) Inventor: Tord Cedell, Bjärred (SE)

(73) Assignee: Comsys AB, Lund (SE)

( * ) Notice: Subject to any disclaimer, the term of this patent is extended or adjusted under 35 U.S.C. 154(b) by 747 days.

(21) Appl. No.: 16/613,280

(22) PCT Filed: May 15, 2018

(86) PCT No.: PCT/EP2018/062569
§ 371 (c)(1),
(2) Date: Nov. 13, 2019

(87) PCT Pub. No.: WO2018/210842
PCT Pub. Date: Nov. 22, 2018

(65) Prior Publication Data

US 2020/0194163 A1 Jun. 18, 2020

(30) Foreign Application Priority Data

May 15, 2017 (SE) .................................... 1750596-7

(51) Int. Cl.
*H01F 27/34* (2006.01)
*H01F 5/06* (2006.01)
(Continued)

(52) U.S. Cl.
CPC ........... *H01F 27/2823* (2013.01); *H01F 5/06* (2013.01); *H01F 27/323* (2013.01); *H01F 27/327* (2013.01)

(58) Field of Classification Search
CPC ........................... H01F 27/2823; H01F 27/323
USPC ........................................................ 336/182
See application file for complete search history.

(56) References Cited

U.S. PATENT DOCUMENTS 2,570,786 A * 10/1951 Flynn .................. H02K 15/045 156/190
3,023,386 A * 2/1962 Wentz ................. H01F 27/2871 336/187

(Continued)

FOREIGN PATENT DOCUMENTS

EP 2312595 A2 4/2011
GB 1056922 A 2/1967

(Continued)

OTHER PUBLICATIONS

English translation of JP200557309 (Year: 2005).*

(Continued)

*Primary Examiner* — Ronald Hinson
(74) *Attorney, Agent, or Firm* — Harness, Dickey & Pierce, P.L.C.

(57) ABSTRACT

The disclosure relates to a coil (100) comprising: a multi-part conductor (110) having a long extension (in relation to its cross-section), the multi-part conductor comprising two or more conductors (A,B) being electrically insulated from each other, wherein, in a cross-section of the multi-part conductor (110), at least two of said two or more conductors (A,B) are arranged adjacent to each other in the direction of the central axis (120), wherein said multi-part conductor (110) is wound around the central axis (120) in more than one circumferential turn, such that a first portion (130) of the multi-part conductor (110) is arranged adjacent to a second portion (132) of the multi-part conductor (110) in the direction of the central axis (120), and wherein said adjacent arrangement of said two or more conductors (A,B) is the same in relation to each other and in relation to the direction of a central axis (120) of the coil (100) for each circumferential turn.

13 Claims, 3 Drawing Sheets

(51) Int. Cl.
*H01F 27/28* (2006.01)
*H01F 27/32* (2006.01)

(56) References Cited

U.S. PATENT DOCUMENTS

| | | | | |
|---|---|---|---|---|
| 3,297,970 | A * | 1/1967 | Jones | H01F 41/127<br>174/DIG. 8 |
| 4,912,446 | A | 3/1990 | Singh et al. | |
| 2007/0250143 | A1 | 10/2007 | Sommer | |
| 2010/0277004 | A1* | 11/2010 | Suzuki | H01F 27/2871<br>307/104 |
| 2012/0279754 | A1* | 11/2012 | Rabbia | H02K 3/14<br>174/117 R |

FOREIGN PATENT DOCUMENTS

| | | | |
|---|---|---|---|
| JP | H0786059 | A | 3/1995 |
| JP | 2002170729 | A | 6/2002 |
| WO | 2012127936 | A1 | 9/2012 |

OTHER PUBLICATIONS

International Preliminary Report on Patentability from the International Search Authority issued in PCT/EP2018/062569, dated Aug. 28, 2019.

International Search Report and Written Opinion of the International Search Authority issued in PCT/EP2018/062569, dated Sep. 4, 2018; ISA/EP.

* cited by examiner

COIL

CROSS REFERENCE TO RELATED APPLICATIONS

This application is a U.S. National Phase under 35 U.S.C. 371 of International Application No. PCT/EP2018/062569, filed May 15, 2018, and published as WO2018/210842 A1 on Nov. 22, 2018. This application is based on and claims priority to Sweden Application No. 1750596-7 filed May 15, 2017. The entire disclosures of the above applications are incorporated herein by reference.

FIELD OF THE INVENTION

The present disclosure relates to a coil. More specifically, the disclosure relates to an electromagnetic coil.

BACKGROUND ART

Electromagnetic coils are electrical conductors such as a wire in the shape of a coil, spiral or helix. Electromagnetic coils are used in electrical engineering, in applications where electric currents interact with magnetic fields, in devices such as inductors, electromagnets, transformers, and sensor coils.

For applications requiring relatively large alternating currents, i.e. chokes for active frontend output filters, dU/dt chokes for output filters for drives, grid side chokes for active harmonic filters, large time-varying magnetic fields will be present. Such magnetic fields will influence the distribution of an electric current flowing within an electrical conductor, by electromagnetic induction. The alternating magnetic field induces eddy currents in adjacent conductors, affecting the distribution of current flowing through them. The result is that the current is concentrated in the areas of the conductor furthest away from nearby conductors carrying current in the same direction. This so called proximity effect can significantly increase the AC resistance of adjacent conductors when compared to its resistance to a DC current. The effect increases with frequency. At higher frequencies, the AC resistance of a conductor can easily exceed ten times its DC resistance. Furthermore, induced eddy currents due to alternating currents also affect the distribution of current within a single wire. This so called skin effect will also contribute to increasing the AC resistance of the conductor. As the name implies, the electric current will flow mainly at the “skin” of the conductor. More specifically, the current will predominately be flowing between the outer surface of the conductor and a level within the conductor called the skin depth. Thus, the skin effect and the proximity effect is effectively a result of the same overall physical mechanism, i.e. induced eddy currents due to the presence of a time-varying magnetic field.

The increased AC resistance in the conductor due to the proximity and skin effects may for high energy alternating current applications become a significant problem. One disadvantage is that a higher resistance will introduce unwanted power losses in the system. This will in turn generate unwanted heat within the conductor and thus increase the temperature of the system. Furthermore, it will make the coil less efficient.

SUMMARY

There is thus a need for an improved coil which allows for decreasing the non-uniformity of the current distribution within the coil conductor. Thus, according to a first aspect, there is provided a coil comprising: a multi-part conductor having a long extension in relation to its cross-section, the multi-part conductor comprising two or more conductors with substantially equal cross-section being electrically insulated from each other, wherein, in a cross-section of the multi-part conductor, at least two of said two or more conductors are arranged adjacent to each other in the direction of the central axis, wherein said multi-part conductor is wound around the central axis in more than one circumferential turn, such that a first portion of the multi-part conductor is arranged adjacent to a second portion of the multi-part conductor in the direction of the central axis, and wherein said adjacent arrangement of said two or more conductors is the same in relation to each other and in relation to the direction of a central axis of the coil for each circumferential turn.

The multi-part conductor is acting as a wire in a traditional coil, but the conductors of the multi-part conductor are big and look more like bent metal rods or metal bands. The plurality of conductors in the multi-part conductor are the equivalent of strands in a wire of a traditional coil.

The coil may be advantageous as it facilitates a more uniform distribution of current inside the two conductors. One reason for this is that using two or more conductors within the multi-part conductor may, for a case where the skin depth is small compared to the conductor size, help distribute the current more efficiently, thus decreasing the maximum current density. Another reason is that the two or more conductors changes their position in relation to the edge of the coil as a result from the way the multi-part conductor is wound. Thus, a first conductor of the multi-part conductor will, in the first portion, be located at a position close to an edge of the coil such that the first conductor, along the direction of the central axis, have a conductor different from the first conductor located only on one side of the first conductor. In a second portion of the multi-part conductor, the first conductor will, however, be located inside the coil such that the first conductor, along the direction of the central axis, have conductor(s) different from the first conductor on both sides of the first conductor.

The part of a conductor being located at an edge will be subjected to the strongest proximity effect as the magnetic fields generated by adjacent conductors will add constructively to the field within the part of the conductor located at the edge. A part of a conductor located within the coil, along the direction of the central axis, will be subjected to a weaker proximity effect as the magnetic fields generated by adjacent conductors on both sides will partly add destructively to the magnetic field inside the part of the conductor located within the coil. As each conductor will be located partly at a position close to an edge and partly at a position in the interior of the coil, the overall proximity effect will decrease and hence the overall resistance of the coil will be lowered. A further advantage is that the two or more conductors will be affected by eddy currents to a similar degree. Hence, the AC resistance, and thus also the current, in each of the two or more conductors will be similar when the two or more conductors are connected in parallel to an AC source. A still further advantage is that the conductors of the multi-part conductor will have the same length, thus presenting the equal electrical resistance.

According to some embodiments, the coil further comprises at least one electrically insulating element interposed between said first portion and said second portion. The electrically insulating element has the function of electrically insulating one layer of turns of the multi-part conductor from another layer of turns of the multi-part conductor, the layers being interposed on top of each other in the in the direction of the central axis of the coil. The electrically insulating element has the effect that the resonance frequency of the coil increases to higher frequencies.

According to some embodiments, the coil further comprises an input interface, wherein the input interface is adapted to input a current into the two or more conductors of the multi-part conductor. The input interface is used to input the same current in all conductors of the multi-part conductor and may e.g. be a soldering or any solution to connect the conductors of the multi-part conductor together.

According to some embodiments, the multi-part conductor is wound around the central axis in a plurality of circumferential turns.

According to some embodiments, the multi-part conductor is wound around the central axis such that a distance between the central axis and the multi-part conductor in a first circumferential turn is larger than a distance between the central axis and the multi-part conductor in a second circumferential turn.

According to some embodiments, the multi-part conductor further comprises an intermediate portion connecting the first portion with the second portion, wherein the intermediate portion is located at a position corresponding to the closest distance between the central axis and the multi-part conductor. By placing the intermediate portion towards the central axis, and winding the turns from the middle of the coil, the connecting portions of the coil will be located at the outside of the coil, in relation to the central axis. This kind of winding of a coil is sometimes called an a-coil or a-winding. These coils are wound from the middle in two layers of turns, in relation to a central axis of the coil. The layers are wound in opposite directions with subsequent turns being placed outside the previous ones in relation to the central axis so that the connecting portions of the wound conductor are both located on the periphery of the coil in relation to the central axis.

According to some embodiments, the two or more conductors have a substantially rectangular cross section, each of the two or more conductors being arranged such that the longest dimension of the cross section of the conductor is perpendicular to the central axis. Proximity effects of the multi-part conductor are thereby minimized.

According to some embodiments, the two or more conductors have a substantially rectangular cross section, each of the two or more conductors being arranged such that the longest dimension of the cross section of the conductor is collinear to the central axis. Manufacturing of the coil using a multi-part conductor is thereby facilitated as each conductor is then easier to bend.

According to some embodiments, the dimensions of the cross section of the two or more conductors are within the range 1-8 mm and 5-25 mm respectively.

According to some embodiments, the two or more conductors are electrically insulated from each other by an insulating material. According to some embodiments, each conductor is electrically insulated by an insulating band material wound around the conductor using an overlap.

According to some embodiments, the electrical insulation of each conductor further comprises a thermosetting polymer impregnated into the insulating band material.

According to some embodiments, the thermosetting polymer is one or more from: a resin, epoxy, polyurethane, varnish.

According to some embodiments, the multi-part conductor comprises two conductors. This may be an advantage as each of the two conductors will be arranged at an edge of the coil, thus efficiently reducing the resistance due to the proximity effect.

It is understood that the multi-part conductor may have more than two conductors. For example, according to some embodiments, the multi-part conductor comprises three conductors. The advantage of using more than two conductors is that the AC resistance due to the skin effect will be lowered. However, using more than two conductors will increase the AC resistance due to the proximity effect as some conductors will not be present at an edge. Thus, there will be competing processes affecting the AC resistance. The number of conductors may therefore be chosen differently depending on the preferred properties of the coil.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles “a,” “an,” “the,” and “said” are intended to mean that there are one or more of the elements unless the context clearly dictates otherwise. Thus, for example, reference to “a unit” or “the unit” may include several devices, and the like. Furthermore, the words “comprising”, “including”, “containing” and similar wordings does not exclude other elements or steps.

BRIEF DESCRIPTIONS OF THE DRAWINGS

The invention will by way of example be described in more detail with reference to the appended drawings, which shows presently preferred embodiments.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
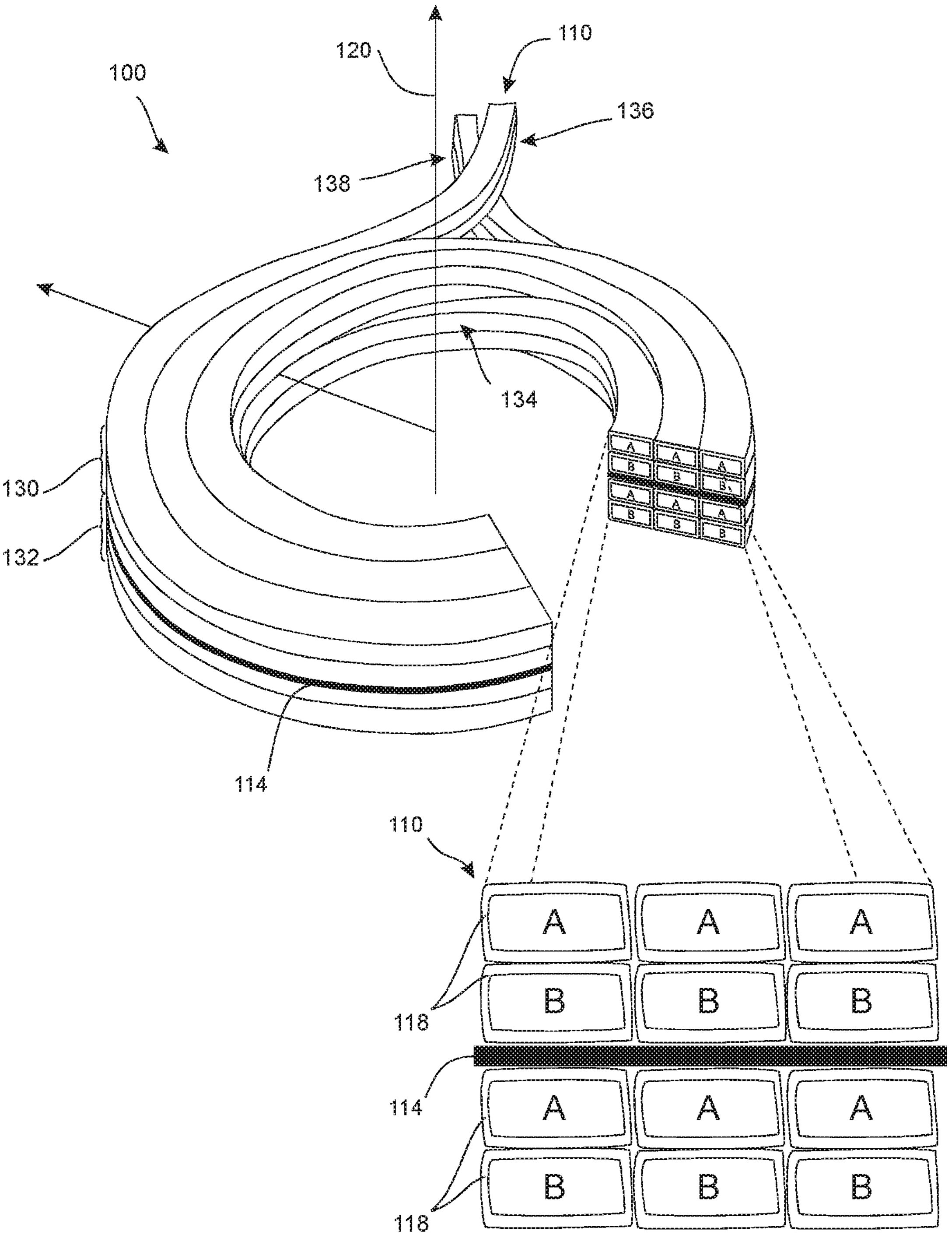
FIG. 1 shows a perspective view of the coil according to embodiments of the present disclosure comprising two conductors.

FIG. 1 shows a coil 100 comprising a multi-part conductor 110. The coil 100 is intended for high alternating current applications such as active filters, etc. The multi-part conductor 110 comprises two conductors A,B being electrically insulated from its surroundings and each other by an electrically insulating layer of varnish 118. The varnish layer 118 is very thin and only about 20 μm thick. The two conductors A,B are arranged adjacent to each other in the direction of a central axis 120 of the coil 100. The multi-part conductor 110 is wound around the central axis 120 in more than one circumferential turn. In the example shown in FIG. 1, the multi-part conductor 110 is wound around the central axis 120 in 6 turns. The multi-part conductor 110 is wound around the central axis 120 such that a first portion of the multi-part conductor is arranged adjacent to a second portion of the multi-part conductor in the direction of the central axis 120. This geometry facilitates a more uniform distribution of current inside the two conductors A,B as the two conductors A,B changes their relative position to each other as a result from the way the multi-part conductor 110 is wound. For example, with reference to FIG. 1, the first conductor A of the multi-part conductor 110 will, in a first portion 130, be located at a position close to an edge of the coil 100 such that the first conductor A, along the direction of the central axis 120, have the second conductor B located only on one side of the first conductor A. In a second portion 132 of the multi-part conductor, the first conductor A will, however, be located inside the coil such that the second conductor, along the direction of the central axis 120, is located on both sides of the first conductor A. By this arrangement each conductor will be located partly at a position close to an edge of the coil and partly in the interior thereof. This may decrease the effect of induced eddy currents on the conductors and hence the overall AC resistance of the coil may be lowered. The effect will be more pronounced for low AC frequencies and/or for small cross sectional areas of the conductors. A further advantage is that the two conductors will be affected by eddy currents to a similar degree. Hence, the current in the first conductor A will be similar to the current in the second conductor B, when the two conductors are connected in parallel to an AC source.

To be able to achieve the winding just described, it is practical to start the winding from the intermediate portion, where the multi-part conductor goes from the first portion 130 to the second portion 132 in the direction of the central axis 120, and wind the multi-part conductor 110 in both directions in turns that for each if the first portion 130 and the second portion 132, respectively, are wound so that each new turn us further away from the central axis 120 than the previous. The connecting portions 136, 138 may thereby be located at the outer side in relation to the central axis and at the same angular position in relation to the central axis 120.

Any voids between the conductors are filled by epoxy to avoid having air gaps in the coil that would affect heat conduction in a negative way.

With reference to FIGS. 1-4 the coil 100 further comprises an electrically insulating element 114 interposed between the first portion 130 and the second portion 132. The electrically insulating element 114 has the function of electrically insulating one layer of turns of the multi-part conductor 110 from another layer of turns of the multi-part conductor 110, the layers being interposed on top of each other in the in the direction of the central axis 120 of the coil. The electrically insulating element 114 may be made of a plastic material, a glass-reinforced plastic or the like. The plate has the effect that the resonance frequency of the coil increases to higher frequencies. The degree of electrical insulation provided by the electrically insulating element 114, e.g. determined by its material and/or thickness, may thereby be used to change the resonance frequency of the coil 100 in line with specific requirements.

As seen in FIG. 1, the conductors A,B have a substantially rectangular cross section. Furthermore, each of the conductors A,B is arranged such that the longest dimension of the cross section of the conductor is perpendicular to the central axis 120. In the coil 100, the dimensions of the cross section of the conductors A,B are 3 mm in the dimension parallel with the central axis 120 and 12 mm in the direction perpendicular to the central axis 120.

As can be seen in FIG. 1, the coil 100 has six turns around the central axis 120. The coil is wound such that a first portion 130 of the multi-part conductor 110 (the "top" layer) and the second portion 132 of the multi-part conductor 110 (the "bottom" layer) have similar length, a length corresponding to nearly three turns. Apart from the first portion 130 and the second portion 132, the multi-part conductor 110 will also comprise an intermediate portion 134 which is arranged to connect the first portion 130 with the second portion 132. Furthermore, the coil will comprise connecting portions 136, 138 arranged to be connected to for example an electric grid and/or circuit.

Furthermore, each of the first portion 130 and the second portion 132 comprises three turns. As can be seen in FIG. 1, this is achieved by winding the multi-part conductor 110 around the central axis 120 such that a distance between the central axis 120 and the multi-part conductor in a first circumferential turn is larger than a distance between the central axis 120 and the multi-part conductor 110 in a second circumferential turn. In other words, for each portion of the multi-part conductor 110, the multi-part conductor 110 is wound such as to follow a spiral curvature from a position of an outer (larger) radius of the coil to a position of an inner (shorter) radius of the coil 110.

Figure 2:
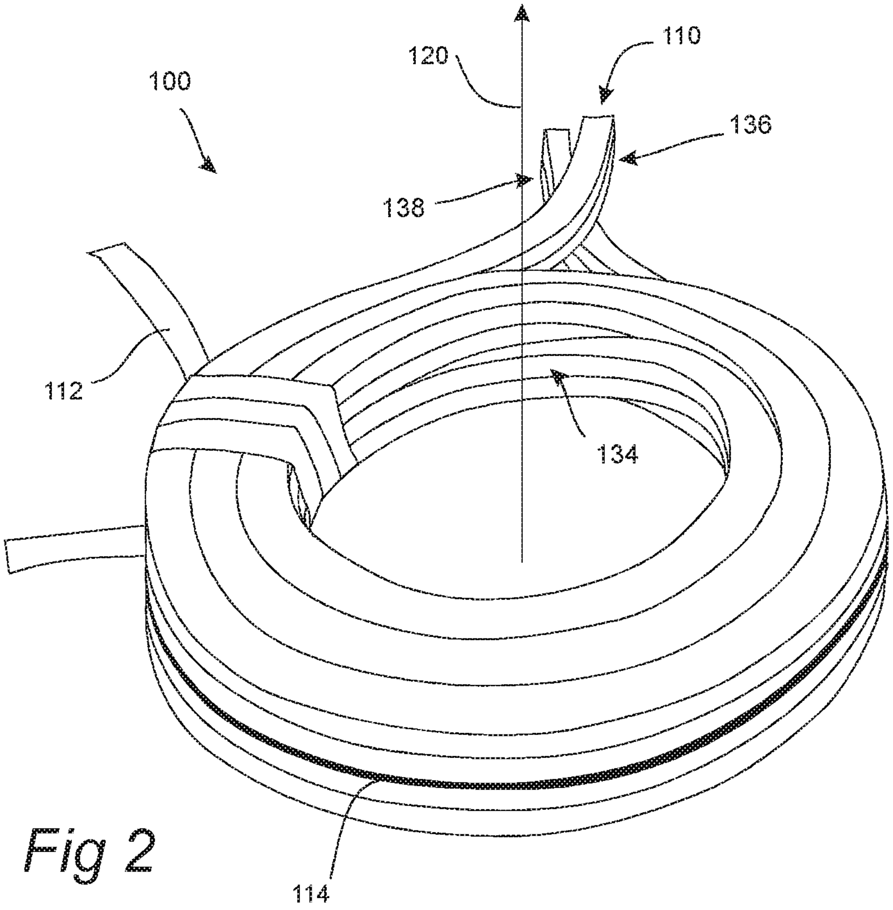
FIG. 2 shows a perspective view of the coil in FIG. 1 where the coil is wound with isolation tape.
Figure 3:
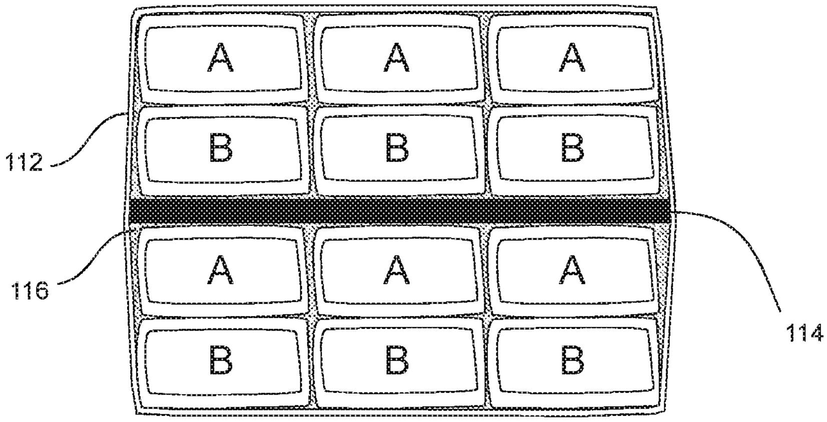
FIG. 3 shows a cross section of coil in FIG. 2.

The electrical insulation is crucial for reliable operation of the coil. In FIG. 2 and FIG. 3 it is shown how the coil has an insulating cover 112 that comprises an isolating band material wound around the conductor using an overlap. One example of such an isolating band material is the Nomex® 410 by DuPont™. The overlap is typically around 50%. The isolating band material is impregnated using resins or varnishes to create a high degree of electric insulation with a high degree of uniformity. Imperfections, such as small air pockets, may occur in the insulation at specific positions along a conductor A,B. Such imperfections may severely decrease the heat conduction and, furthermore, increase the risk of tear due to partial discharge between adjacent portions of the conductor. To overcome this problem, the coil is treated such that air pockets are filled with a thermosetting polymer, such as a varnish, resin, epoxy or polyurethane 116. The heat conduction may be further increased by adding another material to the thermosetting polymer, for example, aluminum oxide or aluminum hydroxide. Efficient filling of the cavities may be mitigated by using vacuum infiltration.

Figure 4:
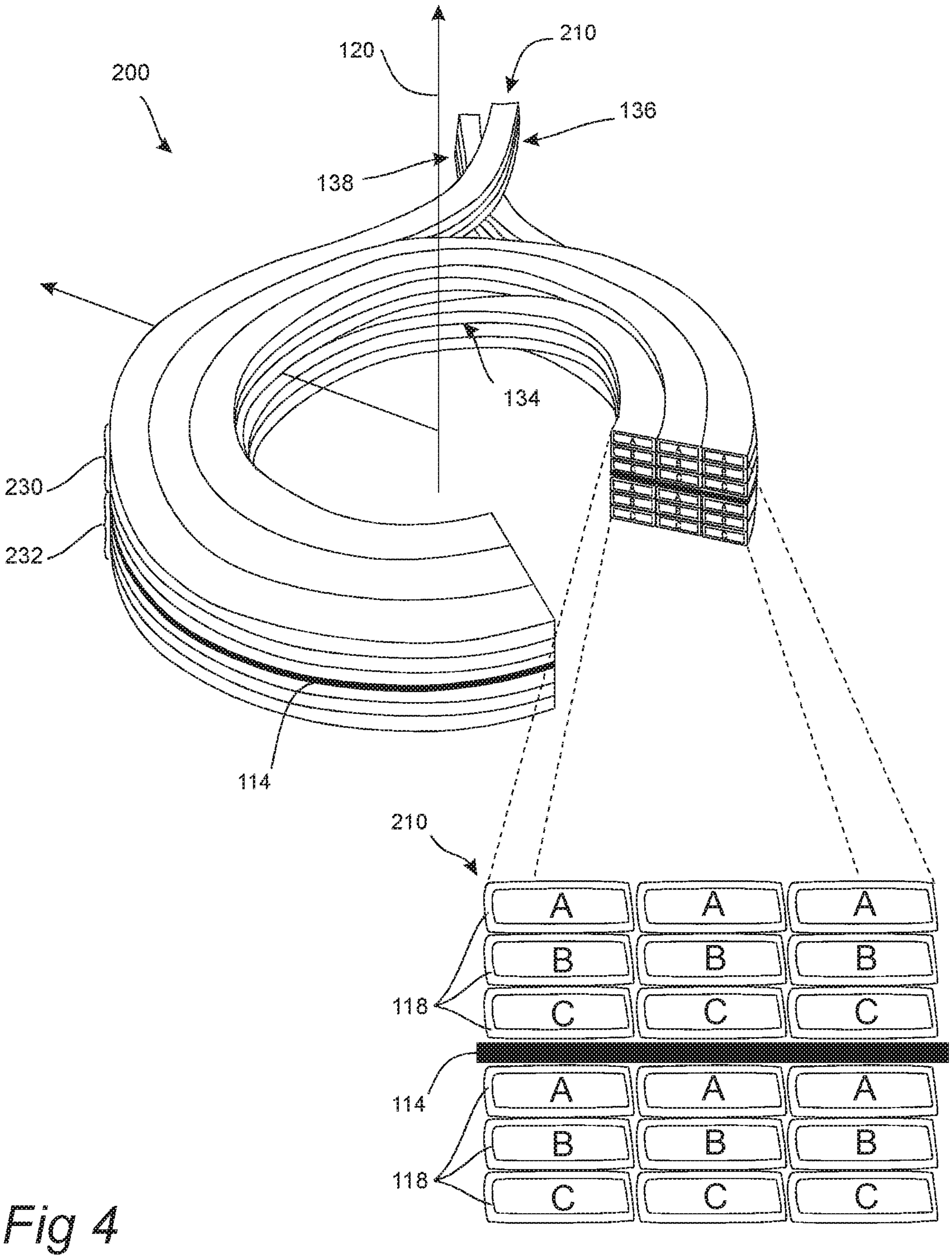
FIG. 4 shows a perspective view of the coil according to embodiments of the present disclosure comprising three conductors.

The coil may comprise a multi-part conductor 210 with more than two conductors. FIG. 4 shows a coil 200 with a multi-part-conductor comprising three conductors A,B,C. For the coil 200, the second conductor B will, along the direction of the central axis 120, always have a presence of another conductor at both sides of the second conductor B. The first conductor A and the third conductor C will, however, be located at an edge of the coil 200 within either the first portion 230 or the second portion 232 of the multi-part conductor 210.

The person skilled in the art realizes that the present invention by no means is limited to the preferred embodiments described above. On the contrary, many modifications and variations are possible within the scope of the appended claims.

For example, the multi-part conductor may comprise a plurality of conductors arranged along the direction of the central axis 120 and potentially also along an axis parallel with a radial axis of the coil. The conductors may have a non-rectangular cross section, such as for example a circular cross section.

Additionally, variations to the disclosed embodiments can be understood and effected by the skilled person in practicing the claimed invention, from a study of the drawings, the disclosure, and the appended claims.

The invention claimed is:

1. A coil comprising:

a multi-part conductor having an extension being long in relation to a cross-section of the multi-part conductor, the multi-part conductor comprising two or more conductors having equal cross-section, where the two or more conductors are electrically insulated from each other, wherein, in the instance of cross-section of the multi-part conductor, the two or more conductors have an adjacent arrangement with respect to each other in the direction of a central axis of the coil, wherein the multi-part conductor is wound around the central axis in more than one circumferential turn, such that a first portion of the multi-part conductor is arranged as a top layer and a second portion of the multi-part conductor is arranged as a bottom layer in the direction of the central axis, wherein the arrangement of the two or more conductors is the same in relation to each other and in relation to the direction of a central axis of the coil for each circumferential turn, wherein the multi-part conductor is wound around the central axis such that a distance between the central axis and the multi-part conductor in a first circumferential turn is larger than a distance between the central axis and the multi-part conductor in a second circumferential turn, wherein the multi-part conductor comprises an intermediate portion that connects the first portion with the second portion, the intermediate portion located at a position corresponding to a closest distance between the central axis and the multi-part conductor, and wherein the multi-part conductor further comprises connecting portions located at an outer side in relation to the central axis and at the same angular position in relation to the central axis.

2. The coil according to claim 1, further comprising at least one electrically insulating element interposed between the first portion and the second portion.

3. The coil according to claim 1, further comprising an input interface, the input interface adapted to input a current into the two or more conductors of the multi-part conductor.

4. The coil according to claim 1, wherein the multi-part conductor is wound around the central axis in a plurality of circumferential turns.

5. The coil according to claim 1, wherein the two or more conductors have a substantially rectangular cross section, each of the two or more conductors arranged such that the longest dimension of the cross section of the conductor is perpendicular to the central axis.

6. The coil according to claim 1, wherein the two or more conductors have a substantially rectangular cross section, each of the two or more conductors arranged such that the longest dimension of the cross section of the conductor is collinear to the central axis.

7. The coil according to claim 1, wherein the dimensions of the cross section of each of the two or more conductors are within the range 1-8 mm by 5-25 mm.

8. The coil according to claim 1, wherein the two or more conductors are electrically insulated from each other by an insulating material.

9. The coil according to claim 1, wherein the multi-part conductor comprises two conductors.

10. The coil according to claim 1, wherein the multi-part conductor comprises three conductors.

11. The coil according to claim 1, wherein each conductor is electrically insulated by an insulating band material wound around the conductor using an overlap.

12. The coil according to claim 11, wherein the electrical insulation of each conductor further comprises a thermosetting polymer impregnated into the insulating band material.

13. The coil according to claim 12, wherein the thermosetting polymer comprises a resin, an epoxy, a polyurethane, varnish, or any combination thereof.

* * * * *